(No Model.)

G. J. FANNER & J. A. FITZGERALD.
HANDLE FOR POKERS, &c.

No. 561,100. Patented June 2, 1896.

Witnesses:
E. B. Gilchrist
J. P. Donnelly

Inventors.
George J. Fanner
James A. Fitzgerald
By M. D. Leggett & Co.
Their Attorneys.

UNITED STATES PATENT OFFICE.

GEORGE J. FANNER AND JAMES A. FITZGERALD, OF CLEVELAND, OHIO, ASSIGNORS TO THE FANNER MANUFACTURING COMPANY, OF SAME PLACE.

HANDLE FOR POKERS, &c.

SPECIFICATION forming part of Letters Patent No. 561,100, dated June 2, 1896.

Application filed October 28, 1895. Serial No. 567,091. (No model.)

*To all whom it may concern:*

Be it known that we, GEORGE J. FANNER and JAMES A. FITZGERALD, of Cleveland, in the county of Cuyahoga and State of Ohio, have invented certain new and useful Improvements in Handles for Pokers, &c.; and we do hereby declare the following to be a full, clear, and exact description of the invention, such as will enable others skilled in the art to which it pertains to make and use the same.

Our invention relates to handles for fire-pokers or like articles; and it consists in the peculiar construction of said handle in connection with the shank of the poker or article whereby the handle is easily placed on the shank and when placed it is securely held in position.

It also consists in providing the end of the shank, at that part where the handle is attached, with a head, all of which will be hereinafter more fully set forth and claimed.

Figure 1:
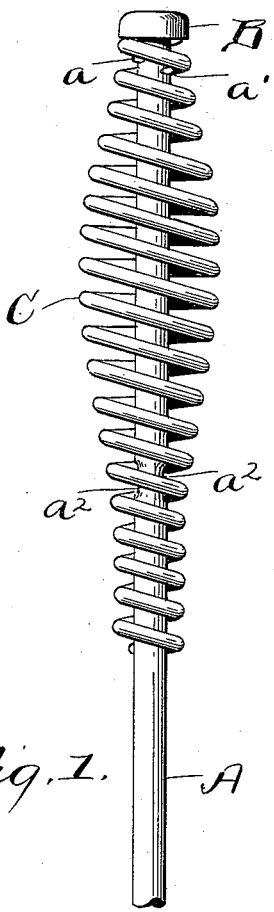
Figure 2:
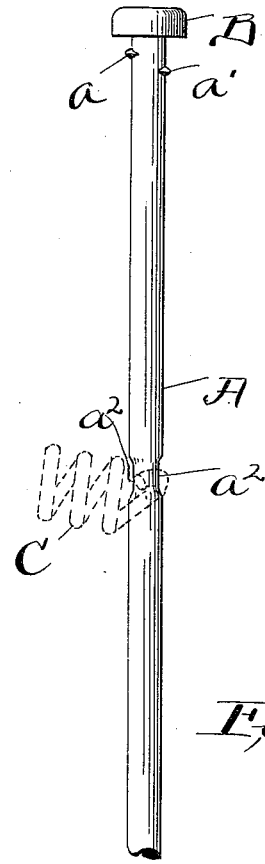

In the drawings, Figure 1 is a view in elevation, illustrating the fire-poker with handle attached. Fig. 2 is a view in elevation of a shank (illustrating in this instance the shank of a poker) before the handle is attached.

A represents the shank of a poker or like article, which is preferably formed cylindrical in cross-section. At the upper end of the shank A we provide a head B, and directly underneath the head B are two or more projections $a$ $a'$, so located on the shank as to correspond to the pitch of the spiral of the handle to be attached. At some distance below the head B on the shank A we form a depression $a^2$, the smallest cross-section of which is about equal to the distance between the spirals of the handle, and this reduced portion provides ready means of starting the spiral handle on the shank, as shown in Fig. 2, inasmuch as it would not be possible or practical to try to enter it from either end because of the head B and the spear or enlarged portion D, these portions having been forged or formed before the handle is secured or attached.

C is a spiral wire handle of usual construction, except that the end spirals are so formed as to be of snug (not too tight) fit. The upper spirals or those nearest the head of the shank engage the projections $a$ $a'$, and the handle is thus held from downward displacement, and the head B prevents any upward or outward displacement or withdrawal of the handle. Another function of the head B is to provide a clean smooth outer end for the handle, and thus prevent any accidental chafing or scratching of the hands of the user. A more perfect finish and better security or retention of the handle are also attained by the head B.

The mode of attaching or connecting the spiral handle C to the shank A is as follows, (see Fig. 2:) After the shank has been headed and pointed or finished the lower spirals are entered at the reduced portion $a^2$ of the shank and the handle turned so as to progress toward the point, and after the last spiral has been passed the upper end of the handle will be located at the reduced portion $a^2$. The handle may then be pushed toward the head B, and after its upper end has come in contact with either lug $a$ or $a'$ a slight twist is given the handle and it is secured or sprung in place.

What we claim is—

1. The combination with the spiral-coil handle of a poker's shank provided, at its upper end, with a head and lugs projecting from the shank directly beneath the head for engaging the upper coil or coils of the handle, the said shank being also provided with a reduced portion beneath the lugs to admit of the spiral handle being placed in position as described.

2. The combination with the spiral-coil handle of a poker's shank provided, at its upper end, with a head and lugs projecting from the shank directly beneath the head for engaging the upper coil or coils of the handle, the said shank being also provided with a reduced portion located about the central portion of the same to admit of the spiral handle being placed in position as described.

In testimony whereof we sign this specification, in the presence of two witnesses, this 20th day of September, 1895.

GEORGE J. FANNER.
JAMES A. FITZGERALD.

Witnesses:
L. WARD HOOVER,
ELLA E. TILDEN.